(12) United States Patent
Boscolo et al.

(10) Patent No.: US 9,110,985 B2
(45) Date of Patent: Aug. 18, 2015

(54) GENERATING A CONCEPTUAL ASSOCIATION GRAPH FROM LARGE-SCALE LOOSELY-GROUPED CONTENT

(75) Inventors: Riccardo Boscolo, Culver City, CA (US); Behnam Attaran Rezaei, Santa Clara, CA (US); Vwani P. Roychowdhury, Los Angeles, CA (US); Albert Chern, Fountain Valley, CA (US); Nima Khajehnouri, Los Angeles, CA (US)

(73) Assignee: NEETSEER, INC., Mountain View, CA (US)

( * ) Notice: Subject to any disclaimer, the term of this patent is extended or adjusted under 35 U.S.C. 154(b) by 186 days.

(21) Appl. No.: 12/906,051

(22) Filed: Oct. 15, 2010

(65) Prior Publication Data

US 2011/0113032 A1 May 12, 2011

Related U.S. Application Data

(60) Provisional application No. 61/252,632, filed on Oct. 16, 2009.

(51) Int. Cl.
*G06F 17/30* (2006.01)

(52) U.S. Cl.
CPC ...... *G06F 17/30734* (2013.01); *G06F 17/3089* (2013.01)

(58) Field of Classification Search
CPC .................. G06F 17/3089; G06F 17/30958
USPC .................. 707/738, 755, 777, 999.102
See application file for complete search history.

(56) References Cited

U.S. PATENT DOCUMENTS

| 5,581,764 A | 12/1996 | Fitzgerald et al. |
| 5,721,910 A | 2/1998 | Unger et al. |
| 5,956,708 A | 9/1999 | Dyko et al. |

(Continued)

FOREIGN PATENT DOCUMENTS

| CN | 101278257 A | 10/2008 |
| EP | 1891509 A2 | 2/2008 |

(Continued)

OTHER PUBLICATIONS

Bagrow, J. P. et al., "A Local Method for Detecting Communities," Physical Review E, vol. 72, No. 4, 2005, 046108, pp. 1-16.

(Continued)

*Primary Examiner* — Syling Yen
(74) *Attorney, Agent, or Firm* — Nixon Peabody LLP (57) ABSTRACT

A method for generating a conceptual association graph from structured content includes grouping content nodes into one or more topically biased clusters, the content nodes comprising structured digital content and unstructured digital content, the grouping based at least in part on the connectedness of each content node member to other content node members in the same cluster. The method also includes, responsive to the grouping, tagging the content nodes with one or more descriptive concepts. The method also includes, responsive to the tagging, establishing one or more associations between the one or more concepts, the one or more associations indicating a relevance of the one or more associations, the indicating based at least in part on patterns of co-occurrence of concepts in the tagged content nodes.

22 Claims, 7 Drawing Sheets

(56) References Cited

U.S. PATENT DOCUMENTS

| | | |
|---|---|---|
| 6,038,560 A | 3/2000 | Wical |
| 6,098,064 A | 8/2000 | Pirolli et al. |
| 6,233,575 B1 | 5/2001 | Agrawal et al. |
| 6,242,273 B1 | 6/2001 | Goodwin et al. |
| 6,339,767 B1 | 1/2002 | Rivette et al. |
| 6,397,682 B2 | 6/2002 | Kumar et al. |
| 6,446,061 B1 | 9/2002 | Doerre et al. |
| 6,544,357 B1 | 4/2003 | Hehmann et al. |
| 6,549,896 B1 | 4/2003 | Candan et al. |
| 6,665,837 B1 | 12/2003 | Dean et al. |
| 6,816,884 B1 | 11/2004 | Summers |
| 6,826,553 B1 | 11/2004 | DaCosta et al. |
| 6,886,129 B1 | 4/2005 | Raghavan et al. |
| 7,031,308 B2 | 4/2006 | Garcia-Luna-Aceves et al. |
| 7,051,023 B2 | 5/2006 | Kapur et al. |
| 7,092,953 B1 | 8/2006 | Haynes |
| 7,181,438 B1 | 2/2007 | Szabo |
| 7,269,253 B1 | 9/2007 | Wu et al. |
| 7,483,711 B2 | 1/2009 | Burchfiel |
| 7,590,589 B2 | 9/2009 | Hoffberg |
| 7,613,851 B2 | 11/2009 | Rice et al. |
| 7,660,855 B2 | 2/2010 | Arning et al. |
| 7,680,796 B2 | 3/2010 | Yeh et al. |
| 7,689,493 B1 | 3/2010 | Sullivan et al. |
| 7,716,060 B2 | 5/2010 | Germeraad et al. |
| 7,725,467 B2 | 5/2010 | Yamamoto et al. |
| 7,725,475 B1 | 5/2010 | Alspector et al. |
| 7,725,525 B2 | 5/2010 | Work |
| 7,730,063 B2 | 6/2010 | Eder |
| 7,805,536 B1 | 9/2010 | Kompella et al. |
| 7,818,191 B2 | 10/2010 | Lutnick et al. |
| 7,822,745 B2 | 10/2010 | Fayyad et al. |
| 7,831,586 B2 | 11/2010 | Reitter et al. |
| 7,885,987 B1 | 2/2011 | Lee |
| 7,958,120 B2 | 6/2011 | Muntz et al. |
| 7,984,029 B2 | 7/2011 | Alspector et al. |
| 7,996,753 B1 | 8/2011 | Chan et al. |
| 8,024,372 B2 | 9/2011 | Harik et al. |
| 8,050,965 B2 | 11/2011 | Hellevik et al. |
| 8,301,617 B2 | 10/2012 | Muntz et al. |
| 8,370,362 B2 | 2/2013 | Szabo |
| 8,380,721 B2 | 2/2013 | Attaran Rezaei et al. |
| 8,412,575 B2 | 4/2013 | Labio et al. |
| 8,417,695 B2 | 4/2013 | Zhong et al. |
| 8,468,118 B2 | 6/2013 | Kim et al. |
| 8,825,654 B2 | 9/2014 | Muntz et al. |
| 8,825,657 B2 | 9/2014 | Rezaei et al. |
| 8,838,605 B2 | 9/2014 | Muntz et al. |
| 8,843,434 B2 | 9/2014 | Rezaei et al. |
| 2001/0037324 A1 | 11/2001 | Agrawal et al. |
| 2001/0049688 A1 | 12/2001 | Fratkina et al. |
| 2002/0016782 A1 | 2/2002 | Cooper |
| 2002/0049792 A1 | 4/2002 | Wilcox et al. |
| 2002/0080180 A1* | 6/2002 | Mander et al. ............... 345/769 |
| 2002/0087884 A1 | 7/2002 | Shacham et al. |
| 2002/0091846 A1 | 7/2002 | Garcia-Luna-Aceves et al. |
| 2002/0143742 A1 | 10/2002 | Nonomura et al. |
| 2003/0046307 A1 | 3/2003 | Rivette et al. |
| 2003/0115191 A1* | 6/2003 | Copperman et al. ............. 707/3 |
| 2003/0187881 A1* | 10/2003 | Murata et al. ................. 707/200 |
| 2003/0217139 A1 | 11/2003 | Burbeck et al. |
| 2003/0217140 A1 | 11/2003 | Burbeck et al. |
| 2003/0220866 A1 | 11/2003 | Pisaris-Henderson et al. |
| 2003/0227479 A1 | 12/2003 | Mizrahi et al. |
| 2004/0024739 A1 | 2/2004 | Copperman et al. |
| 2004/0064438 A1 | 4/2004 | Kostoff |
| 2004/0080524 A1 | 4/2004 | Yeh et al. |
| 2004/0085797 A1 | 5/2004 | Mei et al. |
| 2004/0093328 A1 | 5/2004 | Damle |
| 2004/0122803 A1 | 6/2004 | Dom et al. |
| 2004/0133555 A1 | 7/2004 | Toong et al. |
| 2004/0170328 A1 | 9/2004 | Ladwig et al. |
| 2004/0267638 A1 | 12/2004 | Giunta |
| 2005/0010556 A1 | 1/2005 | Phelan |
| 2005/0021461 A1 | 1/2005 | Flake et al. |
| 2005/0021531 A1 | 1/2005 | Wen et al. |
| 2005/0033742 A1 | 2/2005 | Kamvar et al. |
| 2005/0055321 A1 | 3/2005 | Fratkina et al. |
| 2005/0064618 A1 | 3/2005 | Brown et al. |
| 2005/0065980 A1 | 3/2005 | Hyatt et al. |
| 2005/0086260 A1 | 4/2005 | Canright et al. |
| 2005/0097204 A1 | 5/2005 | Horowitz et al. |
| 2005/0113691 A1 | 5/2005 | Liebschner |
| 2005/0114198 A1 | 5/2005 | Koningstein et al. |
| 2005/0114763 A1 | 5/2005 | Nonomura et al. |
| 2005/0117593 A1 | 6/2005 | Shand |
| 2005/0138070 A1 | 6/2005 | Huberman et al. |
| 2005/0144065 A1 | 6/2005 | Calabria et al. |
| 2005/0144162 A1 | 6/2005 | Liang |
| 2005/0160107 A1 | 7/2005 | Liang |
| 2005/0182755 A1 | 8/2005 | Tran |
| 2005/0203838 A1 | 9/2005 | Zhang et al. |
| 2005/0210008 A1 | 9/2005 | Tran et al. |
| 2005/0210027 A1 | 9/2005 | Aggarwal et al. |
| 2005/0222900 A1 | 10/2005 | Fuloria et al. |
| 2005/0256905 A1 | 11/2005 | Gruhl et al. |
| 2005/0256949 A1 | 11/2005 | Gruhl et al. |
| 2005/0283461 A1 | 12/2005 | Sell et al. |
| 2006/0004703 A1 | 1/2006 | Spivack et al. |
| 2006/0041548 A1 | 2/2006 | Parsons et al. |
| 2006/0047649 A1 | 3/2006 | Liang |
| 2006/0080422 A1 | 4/2006 | Huberman et al. |
| 2006/0085408 A1 | 4/2006 | Morsa |
| 2006/0106793 A1 | 5/2006 | Liang |
| 2006/0106847 A1 | 5/2006 | Eckardt, III et al. |
| 2006/0112105 A1 | 5/2006 | Adamic et al. |
| 2006/0112111 A1 | 5/2006 | Tseng et al. |
| 2006/0168065 A1 | 7/2006 | Martin |
| 2006/0171331 A1 | 8/2006 | Previdi et al. |
| 2006/0184464 A1 | 8/2006 | Tseng et al. |
| 2006/0209727 A1 | 9/2006 | Jennings, III et al. |
| 2006/0212350 A1 | 9/2006 | Ellis et al. |
| 2006/0218035 A1 | 9/2006 | Park et al. |
| 2006/0235841 A1* | 10/2006 | Betz et al. .................. 707/5 |
| 2006/0242017 A1 | 10/2006 | Libes et al. |
| 2006/0271564 A1 | 11/2006 | Muntz et al. |
| 2006/0294155 A1 | 12/2006 | Patterson |
| 2007/0025364 A1 | 2/2007 | Kodialam et al. |
| 2007/0033103 A1 | 2/2007 | Collins et al. |
| 2007/0038614 A1 | 2/2007 | Guha |
| 2007/0061300 A1 | 3/2007 | Ramer et al. |
| 2007/0143329 A1 | 6/2007 | Vigen |
| 2007/0174255 A1 | 7/2007 | Sravanapudi et al. |
| 2007/0198506 A1* | 8/2007 | Rezaei et al. ................ 707/5 |
| 2007/0203903 A1* | 8/2007 | Attaran Rezaei et al. ........ 707/5 |
| 2007/0239534 A1 | 10/2007 | Liu et al. |
| 2007/0245035 A1 | 10/2007 | Attaran Rezaei et al. |
| 2007/0300152 A1 | 12/2007 | Baugher |
| 2008/0033932 A1 | 2/2008 | DeLong et al. |
| 2008/0065483 A1 | 3/2008 | Ball |
| 2008/0086592 A1 | 4/2008 | Stephani |
| 2008/0104061 A1 | 5/2008 | Rezaei |
| 2008/0140491 A1 | 6/2008 | Jain et al. |
| 2008/0232809 A1 | 9/2008 | Beshai et al. |
| 2008/0256061 A1 | 10/2008 | Chang et al. |
| 2008/0301033 A1 | 12/2008 | Singh et al. |
| 2009/0043648 A1 | 2/2009 | Mahdian et al. |
| 2009/0046678 A1 | 2/2009 | Lee et al. |
| 2009/0086663 A1 | 4/2009 | Ho et al. |
| 2009/0157855 A1 | 6/2009 | Adam et al. |
| 2009/0168768 A1 | 7/2009 | Chiabaut et al. |
| 2009/0265475 A1 | 10/2009 | Fujita |
| 2009/0281900 A1 | 11/2009 | Rezaei et al. |
| 2009/0296719 A1 | 12/2009 | Maier et al. |
| 2009/0300009 A1 | 12/2009 | Rezaei et al. |
| 2010/0114879 A1 | 5/2010 | Zhong et al. |
| 2011/0276563 A1 | 11/2011 | Sandoval et al. |
| 2013/0046797 A1 | 2/2013 | Muntz et al. |
| 2013/0046842 A1 | 2/2013 | Muntz et al. |
| 2013/0198191 A1 | 8/2013 | Hernandez et al. |

(56) References Cited

U.S. PATENT DOCUMENTS

2014/0040184 A1  2/2014  Benissan
2014/0067535 A1  3/2014  Rezaei et al.
2014/0351237 A1  11/2014  Rezaei

FOREIGN PATENT DOCUMENTS

WO  WO/2006/121575 A2  11/2006
WO  WO/2007/084616 A2  7/2007
WO  WO/2007/084778 A2  7/2007
WO  WO/2007/100923 A2  9/2007

OTHER PUBLICATIONS

Bollobas, B., "Random Graphs," Second Edition, Cambridge University Press, United Kingdom, 2001, Chapter 1 and 2, pp. 1-59.
Boscolo, R., et al., "Functionality Encoded in Topology? Discovering Macroscopic Regulatory Modules from Large-Scale Protein-DNA Interaction Networks," Reprint arXiv:q-bio/0501039, Jan. 2005.
Chung, F. et. al., "The Small World Phenomenon in Hybrid Power Law Graphs," Lect. Notes Phys., vol. 650, 2004, pp. 89-104.
Clauset, A. et al., "Finding Community Structure in Very Large Networks," Physical Review, vol. 70, No. 6, Dec. 2004, 066111.
Erdos, P. et al., "On the Evolution of Random Graphs," Publication of the Mathematical Institute of the Hungarian Academy of Sciences, vol. 5, 1960, pp. 343-347.
Erdos, P. et al., "On the Strength of Connectedness of a Random Graph," Acta Mathematica Scientia Hungarica, vol. 12, Nos. 1-2, 1961, pp. 261-267.
Flake, G. W. et al., "Self-Organization and Identification of Web Communities," IEEE Computer Society, vol. 35, Issue 3, Mar. 2002, pp. 66-71.
Franceschetti, M. et. al., "Navigation in Small World Networks, a Scale-Free Continuum Model," Jul. 2003, pp. 1-9.
Garton, L., et al., "Studying On-Line Social Networks," Doing Internet Research, Edited by S. Jones, Thousand Oaks, Calif., 1999, pp. 75-105.
Girvan, M. et al., "Community Structure in Social and Biological Networks," PNAS, vol. 99, No. 12, Jun. 2002, pp. 7821-7826.
Golbeck, "Accuracy of Metrics for Inferring Trust and Reputation in Semantic Web-based Social Networks," Apr. 2004, pp. 1-11.
Gonzalez-Barahona, J. M. et al., "Community Structure of Modules in the Apache Project," MSR '05: Proceedings of the 2005 International Workshop on Mining Software Repositories, 2005.
Kernighan, B. W. et al., "An Efficient Heuristic Procedure for Partitioning Graphs," The Bell System Technical Journal 49, Feb. 1970, pp. 291-307.
Lyons, R. et al., "Probability on Trees and Networks," Apr. 17, 2005, pp. 1-53.
Manku, G. S. et. al., "Know thy Neighbor: the Power of Lookahead in Randomized P2P Networks," STOC'04, Jun. 2004, pp. 1-10.
Newman, M. E. J., "Coauthorship Networks and Patterns of Scientific Collaboration," PNAS, vol. 101, Apr. 2004, pp. 5200-5205.
Newman, M. E. J., "Fast Algorithm for Detecting Community Structure in Networks," Physical Review E 69, Jun. 2004, pp. 066133.1-066133.5.
Newman, M.E.J. et al. "Finding and Evaluating Community Structure in Networks," Physical Review E, vol. 69, 026113, 2004, pp. 1-16.
Owczarek, A. L. et. al., "Generalised Percolation Probabilities for the Self-Dual Potts Model," J. Phys. A: Math. Gen. 20, Apr. 1987, pp. 5263-5271.
Page, L. et al., "The PageRank Citation Ranking: Bringing Order to the Web," Technical Report, Stanford InfoLab, 1999.
Patch, K., "Simple Search Lightens Net load," TRN, Sep. 2004, pp. 1-3.
Pons, P. et al., "Computing Communities in Large Networks Using Random Walks," ArXiv Condensed Matter e-prints, Dec. 2004.
Pothen, A. et al., "Partitioning Sparse Matrices with Eigenvectors of Graphs," Society of Industrial and Applied Mathematics, SIAM Journal on Matrix Analysis and Applications, vol. 11, No. 3, Jul. 1990, pp. 430-452.
Radicchi, F. et al., "Defining and Identifying Communities in Networks," PNAS, vol. 101, No. 9, Mar. 2004, pp. 2658-2663.
Rives, A. W. et al., "Modular Organization of Cellular Networks," PNAS, vol. 100, No. 3, Feb. 2003, pp. 1128-1133.
Sarshar, N. et al., "Scalable Percolation Search in Power Law Networks," Jun. 2004, Department of Electrical Engineering, University of California, Los Angeles, pp. 1-13.
Scott, J. "Social Network Analysis: A Handbook," 2nd Edition, Sage Publications, London, 2000, Chapter 4, pp. 63-81.
Wasserman, S., "Social Network Analysis: Methods and Applications," Cambridge University Press, Cambridge, England, 1994, pp. 17-20 and Chapter 7, pp. 249-290.
Wellman, B. et al., "Computer Networks as Social Networks: Collaborative Work, Telework, and Virtual Community," Annual Reviews Sociology, vol. 22, No. 1, 1996, pp. 213-238.
Wu, F. et al., "Finding Communities in Linear Time: a Physics Approach," The European Physical Journal B, vol. 38, No. 2, 2004, pp. 331-338.
Zachary, W. W. "An Information Flow Model for Conflict and Fission in Small Groups," Journal of Anthropological Research, vol. 33, No. 4, Winter, 1977, pp. 452-473.
Chinese Office Action (First) in Chinese Patent Application No. 200680025190.6, dated Sep. 11, 2009.
Chinese Office Action (Second) in Chinese Patent Application No. 200680025190.6, dated Jun. 3, 2010.
International Search Report and Written Opinion for PCT Application No. PCT/US2006/14160, mailed Sep. 4, 2007.
International Search Report and Written Opinion for PCT Application No. PCT/US2007/001335, mailed Feb. 12, 2008.
International Search Report and Written Opinion for PCT Application No. PCT/US2007/001694, mailed Feb. 14, 2008.
International Search Report and Written Opinion for PCT Application No. PCT/US2007/005504, mailed Jul. 29, 2008.
Office Action in U.S. Appl. No. 11/125,329, mailed Mar. 30, 2010.
Office Action in U.S. Appl. No. 11/125,329, mailed Jun. 24, 2009.
Notice of Allowance in U.S. Appl. No. 11/125,329, mailed Feb. 2, 2011.
Office Action in U.S. Appl. No. 11/624,674, mailed Mar. 15, 2010.
Office Action in U.S. Appl. No. 11/624,674, mailed Sep. 21, 2010.
Office Action in U.S. Appl. No. 11/625,279, mailed Mar. 18, 2009.
Office Action in U.S. Appl. No. 11/625,279, mailed May 13, 2010.
Office Action in U.S. Appl. No. 11/625,279, mailed Oct. 25, 2010.
Office Action in U.S. Appl. No. 11/625,279, mailed Dec. 8, 2009.
Office Action in U.S. Appl. No. 11/680,599, mailed Jan. 5, 2011.
Office Action in U.S. Appl. No. 11/680,599, mailed Apr. 29, 2009.
Office Action in U.S. Appl. No. 11/680,599, mailed May 21, 2010.
Office Action in U.S. Appl. No. 11/923,546, mailed Feb. 26, 2010.
Office Action in U.S. Appl. No. 11/923,546, mailed Aug. 2, 2010.
Office Action in U.S. Appl. No. 11/923,546, mailed Dec. 22, 2010.
Office Action in U.S. Appl. No. 11/923,546, mailed Jun. 3, 2011.
Office Action in U.S. Appl. No. 12/130,171, mailed Apr. 1, 2011.
U.S. Appl. No. 13/098,870, filed May 2, 2011.
Chao, I. et al., "Tag Mechanisms Evaluated for Coordination in Open Multi-Agent Systems," ESAW 2007, LNAI 4995, Springer-Verlag Berlin Heidelberg, 2008, pp. 254-269.
Franceschetti et. al., "Closing the Gap in the Capacity of Wireless Networks Via Percolation Theory," Oct. 26, 2004, IEEE, pp. 1-10.
Kini et. al., "Fast and efficient randomized flooding on lattice sensor networks", Nov. 19, 2004, Drexler University, pp. 1-33.
Weikum, G. et al., "Towards Self-Organizing Query Routing and Processing for Peer-to-Peer Web Search," DELIS-TR-0287, 2005, 19 pages.
Notice of Allowance in U.S. Appl. No. 13/098,870, mailed Jun. 28, 2012.
Office Action in U.S. Appl. No. 11/624,674, mailed Dec. 20, 2011.
Office Action in U.S. Appl. No. 11/625,279, mailed Sep. 16, 2011.
Office Action in U.S. Appl. No. 11/625,279, mailed Apr. 17, 2012.
Office Action in U.S. Appl. No. 11/680,599, mailed Aug. 29, 2011.
Office Action in U.S. Appl. No. 11/680,599, mailed Apr. 30, 2012.

(56) References Cited

OTHER PUBLICATIONS

Office Action in U.S. Appl. No. 11/923,546, mailed Aug. 27, 2012.
Office Action in U.S. Appl. No. 12/130,171, mailed Oct. 19, 2011.
Office Action in U.S. Appl. No. 12/130,171, mailed Aug. 15, 2012.
Office Action in U.S. Appl. No. 12/436,748, mailed Sep. 16, 2011.
Office Action in U.S. Appl. No. 12/436,748, mailed May 2, 2012.
Office Action in U.S. Appl. No. 12/476,205, mailed Oct. 12, 2011.
Office Action in U.S. Appl. No. 12/476,205, mailed Jul. 3, 2012.
Office Action in U.S. Appl. No. 12/610,202, mailed May 22, 2012.
Calado, P., et al., "Combining Link-Based and Content_Based Methods for Web Document Classifications," CIKM'03, pp. 394-401, ACM, 2003.
Jiang, et al., "Monotone Percolation and the Topology Control of Wireless Networks", California Institute of Technology, Electrical Engineering Dept, 0-7803-8968-9/05, 2005, pp. 327-338.
Kong et al., "Collaborative Spam Filtering Using E-Mail Networks", Aug. 2006, IEEE, pp. 67-73.
Newman, et al., "Scaling and percolation in the small-world network model", Sante Fe Institute, May 6, 1999, pp. 1-12.
Newman, M.E.J., "Random Graphs as Models of Networks", SFI Working Paper: 2002-02-005, 2002, pp. 1-36.
Silverberg, et al., "A Percolation Model of Innovation in Complex Technology Spaces", Sep. 2002, MERIT—Infonomics Research Memorandum Series, pp. 1-24.
Wang, G., "Web Search with Personalization and Knowledge", 2002 Proceedings of the IEEE Fourth International Symposium on Multimedia Software Engineering (MSE '02).
Zou et al., "Email Virus Propagation Modeling and Analysis", Univ. of Mass., Dept. of Electrical and Computer Engineering, Dept of Computer Science, 2004, TR-CSE-03-04, pp. 1-17.
Amendment and Response to Office Action in U.S. Appl. No. 11/125,329, filed Dec. 22, 2009.
Amendment and Response to Office Action in U.S. Appl. No. 11/125,329, filed Sep. 30, 2010.
Preliminary Amendment in U.S. Appl. No. 13/098,870, filed Dec. 19, 2011.
Office Action in U.S. Appl. No. 13/660,940, mailed Jan. 6, 2014.
Amendment and Response to Office Action in U.S. Appl. No. 13/660,940, filed Apr. 7, 2014.
Notice of Allowance in U.S. Appl. No. 13/660,940, mailed Jun. 13, 2014.
Office Action in U.S. Appl. No. 13/660,955, mailed Jan. 8, 2014.
Amendment and Response to Office Action in U.S. Appl. No. 13/660,955, filed Apr. 7, 2014.
Notice of Allowance in U.S. Appl. No. 13/660,955, mailed Jun. 16, 2014.
Response to Restriction Requirement and Amendment in U.S. Appl. No. 11/624,674, mailed Sep. 29, 2009.
Amendment and Response to Office Action in U.S. Appl. No. 11/624,674, mailed Jun. 15, 2010.
After Final Response to Office Action and Request for Reconsideration in U.S. Appl. No. 11/624,674, mailed Nov. 19, 2010.
Advisory Action in U.S. Appl. No. 11/624,674, mailed Feb. 15, 2011.
Amendment and Response to Office Action in U.S. Appl. No. 11/624,674, mailed Oct. 21, 2011.
Proposed Amendment and Response to Office Action in U.S. Appl. No. 11/624,674, mailed May 16, 2012.
Amendment and Response to Office Action in U.S. Appl. No. 11/624,674, mailed May 21, 2012.
Notice of Allowance in U.S. Appl. No. 11/624,674, mailed Oct. 12, 2012.
Preliminary Amendment in U.S. Appl. No. 11/625,279, filed May 31, 2007.
Amendment and Response to Office Action in U.S. Appl. No. 11/625,279, filed Sep. 18, 2009.
Amendment and Response to Office Action in U.S. Appl. No. 11/625,279, filed Mar. 2, 2010.
Amendment and Response to Office Action in U.S. Appl. No. 11/625,279, filed Aug. 13, 2010.
Amendment and Response to Office Action in U.S. Appl. No. 11/625,279, filed Apr. 15, 2011.
Amendment and Response to Office Action in U.S. Appl. No. 11/625,279, filed Mar. 16, 2012.
Amendment and Response to Office Action in U.S. Appl. No. 11/625,279, filed Oct. 17, 2012.
Office Action in U.S. Appl. No. 11/625,279, mailed Feb. 12, 2013.
Amendment and Response to Office Action in U.S. Appl. No. 11/625,279, filed Aug. 12, 2013.
Final Office Action in U.S. Appl. No. 11/625,279, mailed Oct. 3, 2013.
Amendment and Response to Office Action in U.S. Appl. No. 11/625,279, filed Jan. 3, 2014.
Notice of Allowance in U.S. Appl. No. 11/625,279, mailed Apr. 16, 2014.
U.S. Appl. No. 14/457,693, filed Aug. 12, 2014.
Amendment and Response to Office Action in U.S. Appl. No. 11/680,599, filed Oct. 29, 2009.
Amendment and Response to Office Action in U.S. Appl. No. 11/680,599, filed Aug. 23, 2010.
Amendment and Response to Office Action in U.S. Appl. No. 11/680,599, filed Aug. 3, 2011.
Amendment and Response to Office Action in U.S. Appl. No. 11/680,599, filed Feb. 29, 2012.
Amendment and Response to Office Action in U.S. Appl. No. 11/680,599, filed Oct. 30, 2012.
Office Action in U.S. Appl. No. 11/680,599, mailed Jul. 3, 2013.
Amendment and Response to Office Action in U.S. Appl. No. 11/680,599, filed Jan. 3, 2014.
Notice of Allowance in U.S. Appl. No. 11/680,599, mailed Apr. 30, 2014.
Amendment and Response to Office Action in U.S. Appl. No. 11/923,546, filed Jun. 28, 2010.
Amendment and Response to Office Action in U.S. Appl. No. 11/923,546, filed Dec. 2, 2010.
Amendment and Response to Office Action in U.S. Appl. No. 11/923,546, filed Apr. 28, 2011.
Amendment and Response to Office Action in U.S. Appl. No. 11/923,546, filed Apr. 5, 2012.
Amendment and Response to Office Action in U.S. Appl. No. 11/923,546, filed Nov. 6, 2013.
Office Action in U.S. Appl. No. 11/923,546, mailed Jun. 6, 2013.
Amendment and Response to Office Action in U.S. Appl. No. 11/923,546, filed Feb. 27, 2013.
Office Action in U.S. Appl. No. 11/923,546, mailed Aug. 14, 2014.
Amendment and Response to Office Action in U.S. Appl. No. 12/130,171, filed Aug. 1, 2011.
Amendment and Response to Office Action in U.S. Appl. No. 12/130,171, filed Apr. 19, 2012.
Amendment and Response to Office Action in U.S. Appl. No. 12/130,171, filed Feb. 15, 2013.
Office Action in U.S. Appl. No. 12/130,171, mailed May 28, 2013.
Amendment and Response to Office Action in U.S. Appl. No. 12/130,171, filed Nov. 27, 2013.
Office Action in U.S. Appl. No. 12/130,171, mailed Mar. 26, 2014.
Amendment and Response to Office Action in U.S. Appl. No. 12/130,171, filed Jul. 25, 2014.
Office Action in U.S. Appl. No. 12/130,171, mailed Sep. 25, 2014.
Amendment and Response to Office Action in U.S. Appl. No. 12/436,748, filed Mar. 16, 2012.
Amendment and Response to Office Action in U.S. Appl. No. 12/476,205, filed Apr. 12, 2012.
Amendment and Response to Office Action in U.S. Appl. No. 12/476,205, filed Aug. 5, 2013.
Amendment and Response to Office Action in U.S. Appl. No. 12/610,202, filed Oct. 18, 2012.

(56) References Cited

OTHER PUBLICATIONS

Notice of Allowance in U.S. Appl. No. 12/610,202, mailed Dec. 10, 2012.
Japanese Office Action in Application No. 2008-511129 dated Jul. 26, 2011.
Applicant Initiated Interview Summary in U.S. Appl. No. 11/923,546, mailed Oct. 23, 2014.
Applicant Statement of the Substance of Interview (Summary of Interview with Examiner) in U.S. Appl. No. 11/923,546, mailed Nov. 24, 2014.
Office Action in U.S. Appl. No. 14/017,123, mailed Oct. 23, 2014.
Office Action in U.S. Appl. No. 12/476,205, mailed Apr. 16, 2015.
Office Action in U.S. Appl. No. 14/017,123, mailed Apr. 17, 2015.
Office Action in U.S. Appl. No. 12/130,171, mailed May 30, 2015.
Office Action in U.S. Appl. No. 11/923,546, mailed Jun. 9, 2015.

* cited by examiner

Concept tagging without contextual bias

- men, score= 1.0
- diabetes, score= 0.95382
- people, score= 0.937376
- research, score= 0.8725628
- insulin, score= 0.45225
- problems, score= 0.44467
- link, score= 0.34265
- brain, score= 0.2345652
- study, score= 0.1870422
- people with diabetes, 0.156367
- Sweden's Uppsala University, score= 0.11211
- 31% more likely, score= 0.0389327
- pieces of the puzzle, score= 0.0001111

FIG. 4

Concept tagging with contextual bias

- Alzheimer's disease, score= 1.0
- diabetes, score= 0.937376
- insulin, score= 0.8725628
- Alzheimer, score= 0.45225
- people with diabetes, score= 0.44467
- normal brain function, score= 0.34265
- brain, score= 0.2345652
- Swedish study, score= 0.1870422
- memory problems, 0.156367
- blood sugar, score= 0.11211
- diagnosed, score= 0.0389327
- Sweden's Uppsala University, score= 0.034433
- fasting glucose tests, score= 0.0001111

GENERATING A CONCEPTUAL ASSOCIATION GRAPH FROM LARGE-SCALE LOOSELY-GROUPED CONTENT

CROSS-REFERENCE TO RELATED APPLICATIONS

This application is a non-provisional of and claims priority to U.S. Provisional Application No. 61/252,632, filed Oct. 16, 2009 and entitled "Generating A Conceptual Association Graph From Structured Content", the entirety of which is hereby incorporated by reference.

This application is also related to commonly assigned U.S. patent application Ser. No. 11/125,329, filed May 10, 2005 and entitled "Method and Apparatus for Distributed Community Finding", the entirety of which is hereby incorporated by reference.

FIELD OF THE INVENTION

Embodiments of the present invention relate to a system for the extraction of relevant conceptual associations from "groupings" of content. A conceptual association is defined as the connection or link relating concepts, keywords, or abstract ideas. The term "relevant" refers to the fact that such associations are commonly accepted as meaningful according to some criterion. For example, one measure of the relevance of associations among concepts is how frequently they are used in the same paragraph, within the same document, or in the same context. Finally, a "grouping" of content is defined as a collection of content nodes that are related to each other in some functional fashion, thus resulting in a topical bias. Groupings typically originate from relationships that exist between content nodes, either at a semantic level, or because links between them are explicitly defined. For example, a grouping strategy could be defined that associates Web pages that have common terms in the anchor text of hyperlinks pointing to them, e.g. the group of all pages for which the term "diabetes" appears in one or more of the in-link anchors. Often metadata provided with the content set can be used to extract such groupings, as in invention U.S. patent application Ser. No. 11/125,329, filed May 10, 2005 and entitled "Method and Apparatus for Distributed Community Finding", where link structure among the content can be used to group content nodes into communities or groups. In a given set, comprising billions of content, there could be millions of such implied groupings and each content may belong to multiple such groupings.

BACKGROUND

Entity association maps are conventionally generated either manually based on existing taxonomies and encyclopedias or via a hybrid approach where pre-built taxonomies are enriched, either manually or through supervised aggregation. Examples of the former approach are Wikipedia, DMOZ's Open Directory Project or Google's Knol. These taxonomies rely on a substantial collaborative effort in order to span a significant number of topics with enough depth. Therefore, approaches of the second type have been introduced in order to either reduce the cost of building such taxonomies, or to expand their coverage.

In general, given the pace at which information is currently generated, it has become increasingly challenging to create and maintain manually created taxonomies. This is especially true on the World Wide Web, where not only the number of pages online has been increasing at a very rapid pace, but also the percentage of pages with content that quickly varies over time (e.g. news, blogs, personal pages within social networks) started assuming a predominant role. At the same time, the importance of correctly categorizing and organizing, not simply the content of such pages, but the information they contain has reached an unprecedented commercial value.

SUMMARY

Embodiments of the present invention are directed at methods and systems that substantially obviate one or more of the above and other problems associated with conventional techniques for creating conceptual association maps (or taxonomies) and scaling them to a very large body of content, like the pages on the World Wide Web.

One aspect of the invention is a method for clustering structured and unstructured content into topically focused groups of documents and extracting relevant concepts from such content nodes. Another aspect of the invention is a method for determining the relevance of conceptual associations from various patterns of co-occurrence of conceptual entities across different content nodes.

Embodiments of the present invention are capable of extracting and evaluating what are the concepts (i.e., basic informational units) in the given set of content, in an unsupervised fashion, without the limitations typically imposed by manual or partially supervised approaches.

Embodiments of the present invention are simultaneously capable of extracting and evaluating the relevance of the associations among the concepts derived by the invention on a very large scale, in an unsupervised fashion, without the limitations typically imposed by manual or partially supervised approaches.

According to one embodiment of the present invention, a computerized system for extracting a conceptual association map on a large scale from structured and unstructured content and for scoring such associations based on their relevance is provided.

BRIEF DESCRIPTION OF THE DRAWINGS

The accompanying drawings, which are incorporated into and constitute a part of this specification, illustrate one or more embodiments of the present invention and, together with the detailed description, serve to explain the principles and implementations of the invention.

In the drawings:

FIG. 4 is a block diagram that illustrates content node tagging when no contextual or group bias is available in accordance with one embodiment of the present invention.

FIG. 5 is a block diagram that illustrates content node tagging when the semantic bias resulting from the content node grouping is exploited in accordance with one embodiment of the present invention.

DETAILED DESCRIPTION

Embodiments of the present invention are described herein in the context of generating a conceptual association graph from structured content. Those of ordinary skill in the art will realize that the following detailed description of the present invention is illustrative only and is not intended to be in any way limiting. Other embodiments of the present invention will readily suggest themselves to such skilled persons having the benefit of this disclosure. Reference will now be made in detail to implementations of the present invention as illustrated in the accompanying drawings. The same reference indicators will be used throughout the drawings and the following detailed description to refer to the same or like parts.

Figure 1:
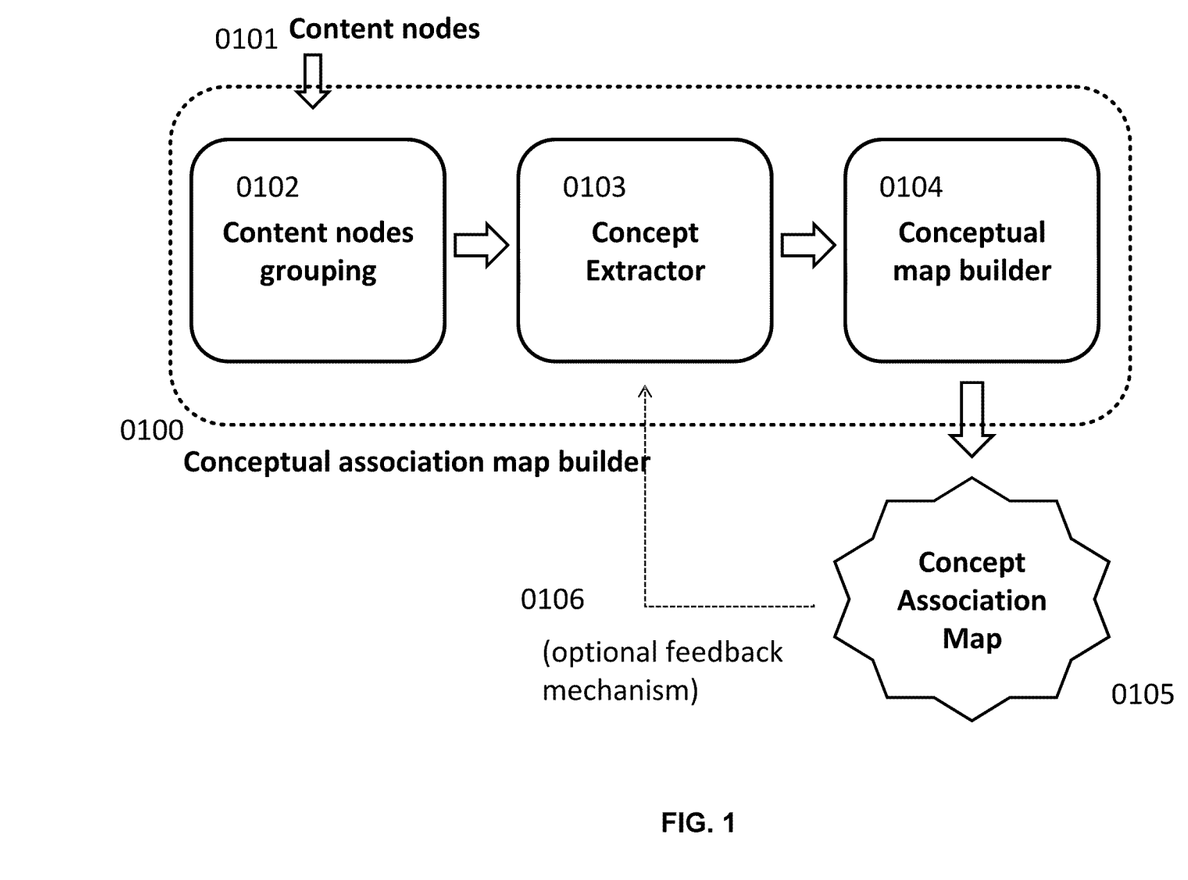
FIG. 1 is a schematic block diagram of a method and architecture and various components of the system according to one embodiment of the invention.

According to one embodiment of the present invention, three separate modules are provided as shown in FIG. 1:
  a. a content grouping module (102), which exploits the structure or metadata information of the data to group content nodes into topically biased clusters;
  b. a concept extraction module (103) that, based on the content grouping, tags content with descriptive concepts and keywords; and
  c. a conceptual map builder (104) that establishes meaningful associations between extracted concepts as well as the relevance of such associations.

The first module, the content grouping module (102), groups content nodes based on their patterns of association. According to one embodiment of the present invention, the system generates groups whose members are densely connected with other members of the same cluster, while being sparsely (or loosely) connected with content nodes that are not part of the cluster. The definition of "link" or "connection" between two content nodes is specific to each of the embodiments of this invention, but it is not limited to any of the types described in such embodiments.

Community finding algorithms are discussed in U.S. patent application Ser. No. 11/125,329, entitled "Method and Apparatus for Distributed Community Finding" the entirety of which is hereby incorporated by reference; and "Finding and evaluating community structure in networks," M. E. J. Newman and M. Girvan, Phys. Rev. E 69, 026113 (2004). According to one embodiment of the present invention, links between content nodes are "hyperlink-style" connections, indicating that a referrer page is pointing to the content (or a section of the content) of a referred-to page.

According to another embodiment of the present invention, connections are "citation-style" links between a content node and a collection of content nodes that are cited as pertinent to the referrer node. Examples of content nodes associated by links of this type are scientific publications, encyclopedias and intellectual property publications (e.g., patents and patent applications).

According to another embodiment of the present invention, links between content nodes are generated from metadata entities, e.g. category tagging, descriptive keywords (as found in web pages as well as scientific articles), by grouping together all the nodes that are tagged with the same keyword or category.

Figure 2:
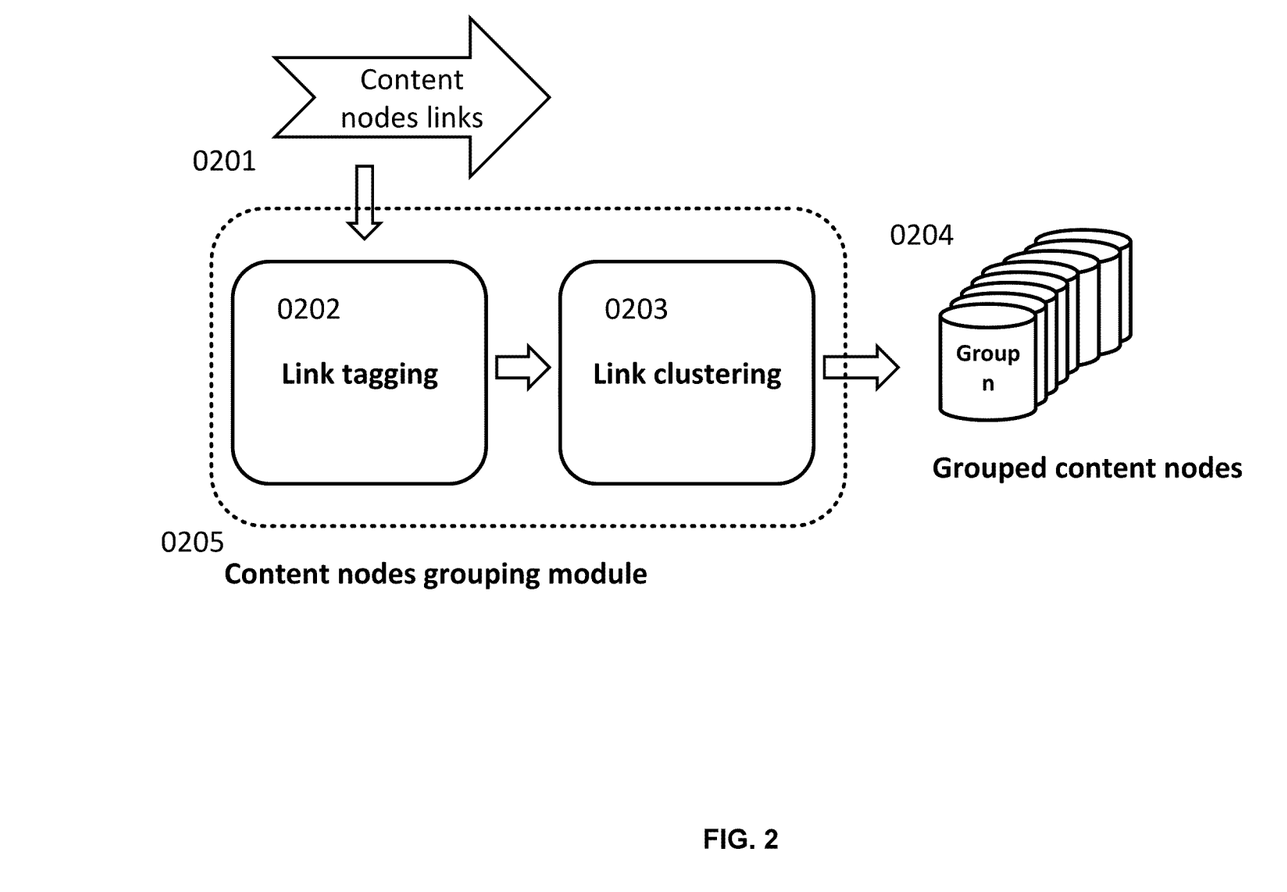
FIG. 2 is a schematic block diagram of one of the possible embodiments of the content nodes grouping module.

FIG. 2 shows the main components of the content grouping module (102) according to one embodiment of the present invention. At 202, the collection of links between all content nodes is pre-processed and tagged: this step classifies the links based on their type and assigns them weights. According to one embodiment of the present invention, hyperlinks are categorized as internet links (links between pages in different domains), intranet links (links between pages within the same domain) where they can in turn be sub-classified as navigational links (links used on the page to navigate the website sequentially, e.g. "Previous" or "Next") and informational inks (which typically link to related pages within the domain). At 203, links are clustered using a community finding algorithm, whose goal is to group together content nodes that are densely connected to each other (intra-connectivity) and sparsely connected to nodes belonging to other groups (inter-connectivity). The groupings generated in this step are generally overlapping, i.e. one content node can belong to more than one grouping, and can be nested. See, e.g., U.S. patent application Ser. No. 11/125,329, entitled "Method and Apparatus for Distributed Community Finding," the entirety of which is hereby incorporated by reference. See also, "Finding and evaluating community structure in networks," M. E. J. Newman and M. Girvan, Phys. Rev. E 69, 026113 (2004).

According to another embodiment of the present invention, the grouping of content nodes is based on anchor text of hyperlinks found in web pages. Pages with common relevant terms in the anchor text of links pointing to them (in-links) are grouped together.

The second module is a concept extractor module (103) whose function is to tag content nodes with descriptive concepts and keywords. The concept extractor module (103) takes advantage of the statistical bias introduced by the topically focused clustering to better target the concept selection.

Figure 3:
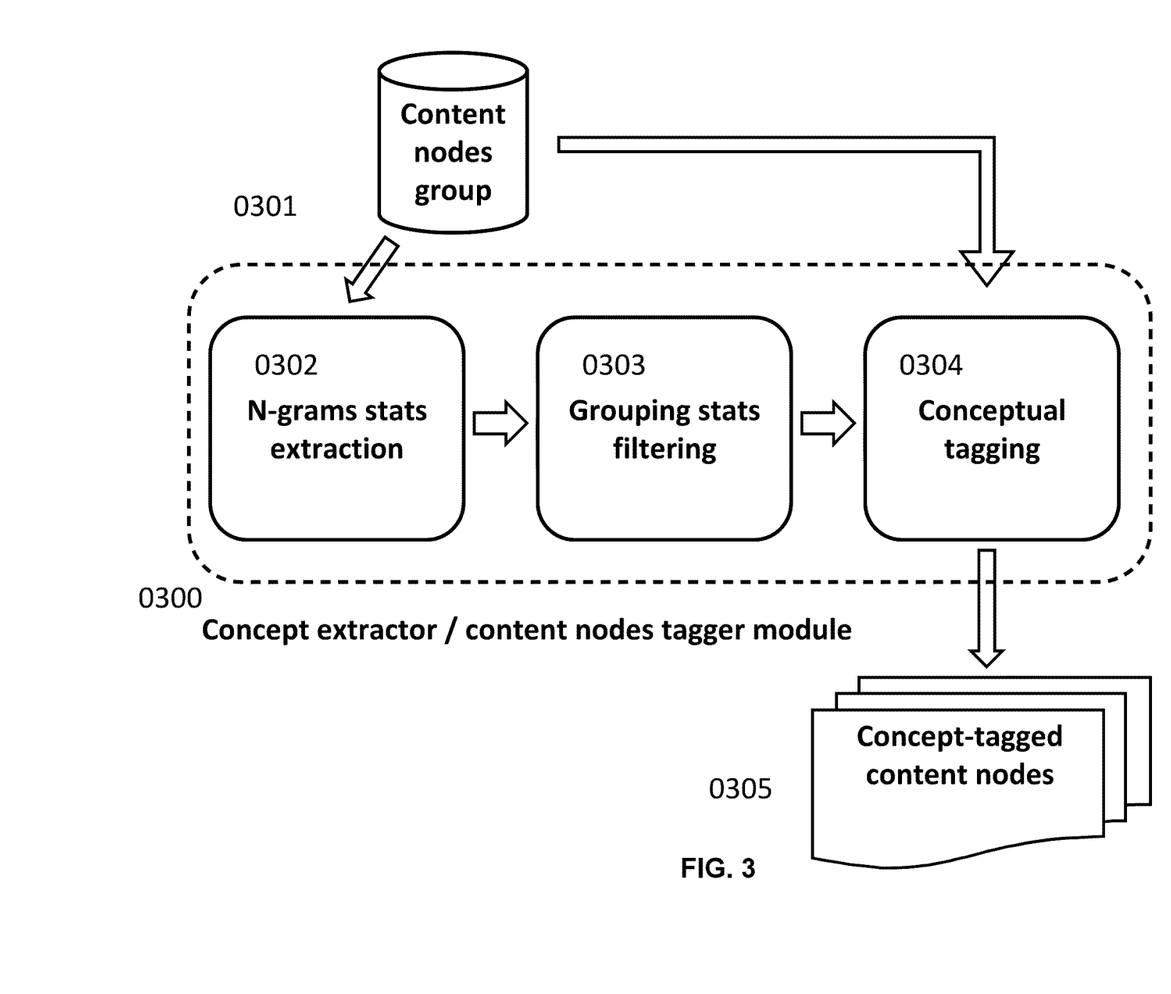
FIG. 3 is a block diagram that illustrates a concept extraction/content tagging module in accordance with one embodiment of the present invention.

FIG. 3 shows the schematic details of the components in the concept extractor module (103). A text tokenizer (0302) analyzes the content of the nodes (0301) in each group and extracts several collective token statistics. An n-gram is a subsequence of n items from a given sequence. The items in question can be phonemes, syllables, letters, words or base pairs according to the application. A token of text is defined as any words n-gram appearing in one or more of the content nodes. Such statistics are then scored and filtered (0303) based on a measure of relevance that takes into account the frequency count of tokens weighed by the relevance of the content nodes (weighted token frequency), the count of the number of pages in which a certain token appears within a group (community document frequency) or within the entire corpus of content nodes (global document frequency).

The statistics extracted from each cluster provide a "view" of the content nodes within a certain grouping. The membership of each content node to a specific grouping is not exclusive, meaning that the same node can be associated to many groups, each providing a different view of the same content. According to one embodiment of the present invention, different content nodes in a grouping might be assigned different weights so a view is generated by aggregating weighted statistics of such nodes. An example of a weighting mechanism is the use of global or topical pagerank of web pages.

Given a specific "view" for a content node, a tagger sub-module (0304) selects appropriate descriptive concepts and keywords for that node (0305). In this step, the topical focus spawning from the grouping stage aids in the process of selecting meaningful conceptual tags for each content node. Conceptual tags can have weights according to score of each n-gram in the view and statistics of that tag on the content node.

FIG. 4 shows the results of applying a similar approach to the one discussed above, but without the topical focus created by the associative grouping. FIG. 5 shows the conceptual tagging results for the same content node when it is "viewed" through a grouping that clusters pages related to diabetes and associated health conditions. The effect of the content node clustering is to "bias" the selection of concepts towards the ones that are more relevant to the topical domain defined by the grouping.

Figure 6:
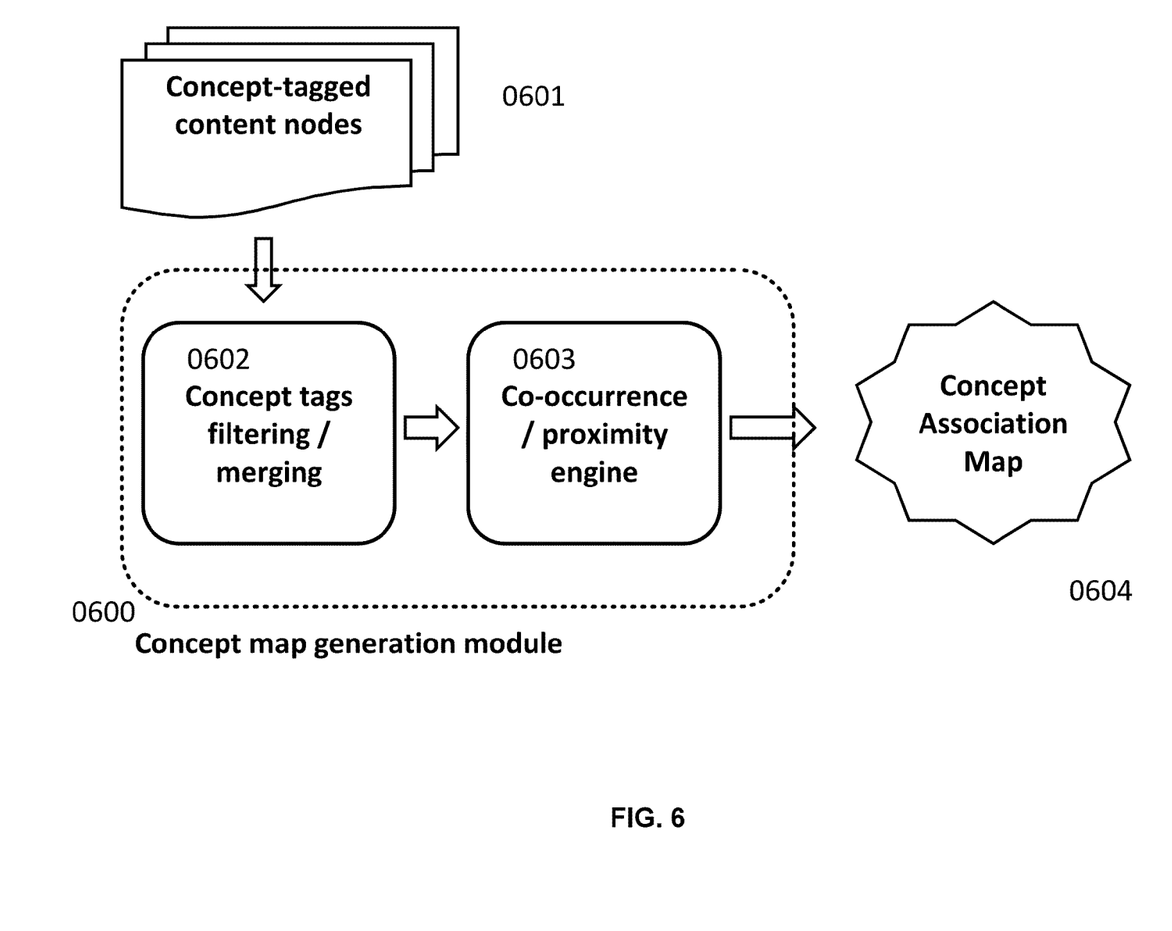
FIG. 6 is a block diagram that illustrates a concept map generation and scoring module in accordance with one embodiment of the present invention.

According to one embodiment of the present invention, the last module, the conceptual map builder (104), comprises a system for finding and scoring conceptual associations based on patterns of co-occurrence of concepts in tagged content nodes, and is illustrated in FIG. 6. The conceptual map builder (104) takes the concept tagged content nodes as an input (601) and generates the final concept association map (0604). The first step in the construction of the concept association map consists of a pre-processing of the concept tagging results through merging of the tags for the same content node, in those cases where the node is assigned to multiple groups (0602). The next step is represented by a co-occurrence/proximity engine (0603) that scores concept associations based on the pattern of appearance of concept pairs within content nodes.

According to one embodiment of the present invention, the pre-processing module (0602) also normalizes the contribution of content nodes generated from the same "source," in order to prevent certain sources from becoming dominant in the definition of a conceptual association. A "source" is generically defined as the entity that provided the content nodes. For example, when content nodes are pages from the World Wide Web, the source is the domain that hosts the web pages.

According to one embodiment of the present invention, the score of a link between two concepts $c_1$ and $c_2$ is given by the probability that a content node is tagged with concept $c_2$ given that it has been tagged with concept $c_1$, estimated over all the content nodes tagged with concept $c_2$.

According to another embodiment of the present invention, the score of a conceptual association is defined as described above but it also weighed by the probability that a given content node should be tagged with a given concept. In other words, this embodiment covers the case where a probability is assigned to the event that a content node is tagged with a certain concept.

According to another embodiment of the present invention, the computation of the association score between two concepts is weighed through a global measure of relevance of the content nodes that are tagged with such concepts. For example, when content nodes are from the World Wide Web, pages that are found to be more relevant according to some criterion (e.g. page rank) play a greater role in the weight definition than pages with lower relevance.

According to another embodiment of the present invention, the association scores are also determined by the positional information of an extracted concept within a concept node. In this version, both the absolute position of a concept within the content node, as well the relative position of two associated concepts in the text play a role in the definition of the association score. For example, concepts appearing in certain sections of the content node that are deemed more relevant (e.g. title, abstract or description) are assigned a larger weight. At the same time, associations between concepts that co-occur within a certain window of words can be scored higher due to their proximity.

According to another embodiment of the present invention, the concept associations found through the method are fed back to the concept extraction module, in order to improve the tagging of each concept node (reference numeral 106 of FIG. 1). In this embodiment, concepts that have been identified as being closely associated in the conceptual map are given a slight preference in the selection over those concepts that have been found to be unrelated. This additional step enforces knowledge on concept associations that was collected over a large corpus to make a more accurate decision on what concepts each content node should be tagged with.

According to another embodiment of the present invention, syntactic or part of speech tagging of tokens in each content node is used as additional tagging of the previously extracted conceptual associations.

Figure 7:
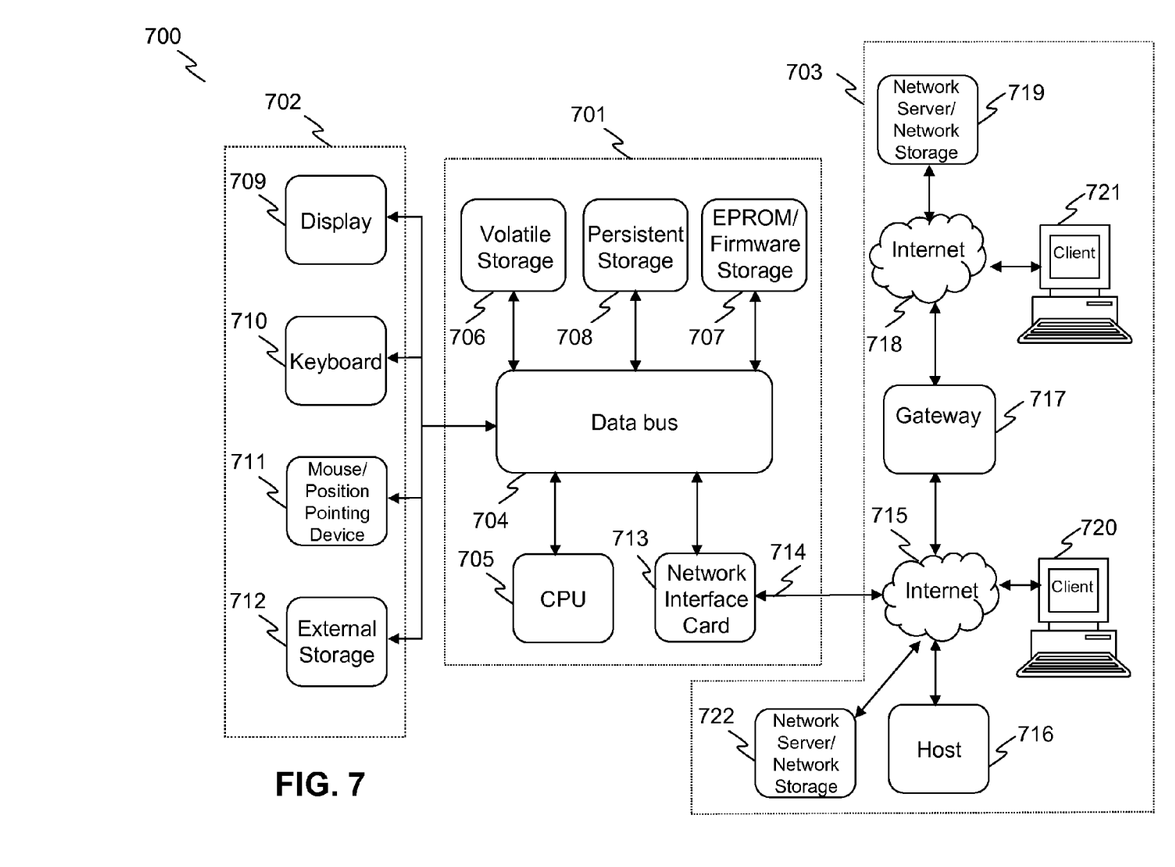
FIG. 7 is a block diagram of a computer system suitable for implementing aspects of the present invention.

FIG. 7 is a block diagram of a computer system 700 suitable for implementing aspects of the present invention. The system 700 includes a computer/server platform 701, peripheral devices 702 and network resources 703.

The computer platform 701 may include a data bus 704 or other communication mechanism for communicating information across and among various parts of the computer platform 701, and a processor 705 coupled with bus 701 for processing information and performing other computational and control tasks. Computer platform 701 also includes a volatile storage 706, such as a random access memory (RAM) or other dynamic storage device, coupled to bus 704 for storing various information as well as instructions to be executed by processor 705. The volatile storage 706 also may be used for storing temporary variables or other intermediate information during execution of instructions by processor 705. Computer platform 701 may further include a read only memory (ROM or EPROM) 707 or other static storage device coupled to bus 704 for storing static information and instructions for processor 705, such as basic input-output system (BIOS), as well as various system configuration parameters. A persistent storage device 708, such as a magnetic disk, optical disk, or solid-state flash memory device is provided and coupled to bus 901 for storing information and instructions.

Computer platform 701 may be coupled via bus 704 to a display 709, such as a cathode ray tube (CRT), plasma display, or a liquid crystal display (LCD), for displaying information to a system administrator or user of the computer platform 701. An input device 710, including alphanumeric and other keys, is coupled to bus 701 for communicating information and command selections to processor 705. Another type of user input device is cursor control device 711, such as a mouse, a trackball, or cursor direction keys for communicating direction information and command selections to processor 704 and for controlling cursor movement on display 709.

An external storage device 712 may be connected to the computer platform 701 via bus 704 to provide an extra or removable storage capacity for the computer platform 701. In an embodiment of the computer system 700, the external removable storage device 712 may be used to facilitate exchange of data with other computer systems.

Embodiments of the present invention are related to the use of computer system 700 for implementing the techniques described herein. According to one embodiment of the present invention, the system may reside on a machine such as computer platform 701. According to one embodiment of the present invention, the techniques described herein are performed by computer system 700 in response to processor 705 executing one or more sequences of one or more instructions contained in the volatile memory 706. Such instructions may be read into volatile memory 706 from another computer-readable medium, such as persistent storage device 708. Execution of the sequences of instructions contained in the volatile memory 706 causes processor 705 to perform the process steps described herein. In alternative embodiments, hard-wired circuitry may be used in place of or in combination with software instructions to implement embodiment of the present invention. Thus, embodiments of the present invention are not limited to any specific combination of hardware circuitry and software.

It should be noted that embodiments of the present invention are illustrated and discussed herein as having various modules which perform particular functions and interact with one another. It should be understood that these modules are merely segregated based on their function for the sake of description and represent computer hardware and/or executable software code which is stored on a computer-readable medium for execution on appropriate computing hardware. The various functions of the different modules and units can be combined or segregated as hardware and/or software stored on a computer-readable medium as above as modules in any manner, and can be used separately or in combination.

The term "computer-readable medium" as used herein refers to any medium that participates in providing instructions to processor 705 for execution. The computer-readable medium is just one example of a machine-readable medium, which may carry instructions for implementing any of the methods and/or techniques described herein. Such a medium may take many forms, including but not limited to, non-volatile media, volatile media, and transmission media. Non-volatile media includes, for example, optical or magnetic disks, such as storage device 708. Volatile media includes dynamic memory, such as volatile storage 706. Transmission media includes coaxial cables, copper wire and fiber optics, including the wires that comprise data bus 704. Transmission media can also take the form of acoustic or light waves, such as those generated during radio-wave and infra-red data communications.

Common forms of computer-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, an EPROM, a FLASH-EPROM, a flash drive, a memory card, any other memory chip or cartridge, a carrier wave as described hereinafter, or any other medium from which a computer can read.

Various forms of computer readable media may be involved in carrying one or more sequences of one or more instructions to processor 705 for execution. For example, the instructions may initially be carried on a magnetic disk from a remote computer. Alternatively, a remote computer can load the instructions into its dynamic memory and send the instructions over a telephone line using a modem. A modem local to computer system 700 can receive the data on the telephone line and use an infrared transmitter to convert the data to an infra-red signal. An infra-red detector can receive the data carried in the infra-red signal and appropriate circuitry can place the data on the data bus 704. The bus 704 carries the data to the volatile storage 706, from which processor 705 retrieves and executes the instructions. The instructions received by the volatile memory 706 may optionally be stored on persistent storage device 708 either before or after execution by processor 705. The instructions may also be downloaded into the computer platform 701 via Internet using a variety of network data communication protocols well known in the art.

The computer platform 701 also includes a communication interface, such as network interface card 713 coupled to the data bus 704. Communication interface 713 provides a two-way data communication coupling to a network link 714 that is connected to a local network 715. For example, communication interface 713 may be an integrated services digital network (ISDN) card or a modem to provide a data communication connection to a corresponding type of telephone line.

As another example, communication interface 713 may be a local area network interface card (LAN NIC) to provide a data communication connection to a compatible LAN. Wireless links, such as well-known 802.11 a, 802.11 b, 802.11 g and Bluetooth may also used for network implementation. In any such implementation, communication interface 713 sends and receives electrical, electromagnetic or optical signals that carry digital data streams representing various types of information.

Network link 713 provides data communication through one or more networks to other network resources. For example, network link 714 may provide a connection through local network 715 to a host computer 716, or a network storage/server 717. Additionally or alternatively, the network link 713 may connect through gateway/firewall 717 to the wide-area or global network 718, such as an Internet. Thus, the computer platform 701 can access network resources located anywhere on the Internet 718, such as a remote network storage/server 719. On the other hand, the computer platform 701 may also be accessed by clients located anywhere on the local area network 715 and/or the Internet 718. The network clients 720 and 721 may themselves be implemented based on the computer platform similar to the platform 701.

Local network 715 and the Internet 718 both use electrical, electromagnetic or optical signals that carry digital data streams. The signals through the various networks and the signals on network link 714 and through communication interface 713, which carry the digital data to and from computer platform 701, are exemplary forms of carrier waves transporting the information.

Computer platform 701 can send messages and receive data, including program code, through the variety of network(s) including Internet 718 and LAN 715, network link 714 and communication interface 713. In the Internet example, when the system 701 acts as a network server, it might transmit a requested code or data for an application program running on client(s) 720 and/or 721 through Internet 718, gateway/firewall 717, local area network 715 and communication interface 713. Similarly, it may receive code from other network resources.

The received code may be executed by processor 705 as it is received, and/or stored in persistent or volatile storage devices 708 and 706, respectively, or other non-volatile storage for later execution. In this manner, computer system 701 may obtain application code in the form of a carrier wave.

Finally, it should be understood that processes and techniques described herein are not inherently related to any particular apparatus and may be implemented by any suitable combination of components. Further, various types of general purpose devices may be used in accordance with the teachings described herein. It may also prove advantageous to construct specialized apparatus to perform the method steps described herein. The present invention has been described in relation to particular examples, which are intended in all respects to be illustrative rather than restrictive. Those skilled in the art will appreciate that many different combinations of hardware, software, and firmware will be suitable for practicing the present invention. For example, the described software may be implemented in a wide variety of programming or scripting languages, such as Assembler, C/C++, perl, shell, PHP, Java, etc.

Moreover, other implementations of the present invention will be apparent to those skilled in the art from consideration of the specification and practice of the present invention disclosed herein. Various aspects and/or components of the described embodiments may be used singly or in any combination in the online behavioral targeting system. It is intended that the specification and examples be considered as exemplary only, with a true scope and spirit of the present invention being indicated by the following claims.

In the interest of clarity, not all of the routine features of the implementations described herein are shown and described. It will, of course, be appreciated that in the development of any such actual implementation, numerous implementation-specific decisions must be made in order to achieve the developer's specific goals, such as compliance with application- and business-related constraints, and that these specific goals will vary from one implementation to another and from one developer to another. Moreover, it will be appreciated that such a development effort might be complex and time-consuming, but would nevertheless be a routine undertaking of engineering for those of ordinary skill in the art having the benefit of this disclosure.

According to one embodiment of the present invention, the components, process steps, and/or data structures may be implemented using various types of operating systems (OS), computing platforms, firmware, computer programs, computer languages, and/or general-purpose machines. The method can be run as a programmed process running on processing circuitry. The processing circuitry can take the form of numerous combinations of processors and operating systems, connections and networks, data stores, or a standalone device. The process can be implemented as instructions executed by such hardware, hardware alone, or any combination thereof. The software may be stored on a program storage device readable by a machine.

While embodiments and applications of this invention have been shown and described, it would be apparent to those skilled in the art having the benefit of this disclosure that many more modifications than mentioned above are possible without departing from the inventive concepts herein. The invention, therefore, is not to be restricted except in the spirit of the appended claims.

What is claimed is:

1. A computer implemented method comprising:
grouping content nodes into one or more topically biased clusters, the content nodes comprising structured digital content and unstructured digital content, the grouping based at least in part on the connectedness of each content node member to other content node members in the same cluster;
tagging the grouped content nodes in each of the one or more topically biased clusters with one or more concepts after grouping the content nodes into one or more topically biased clusters, wherein tagging the content nodes comprises:
analyzing content of the content nodes in each group and extracting a plurality of collective token and potential concept statistics for the grouped content nodes in one of the one or more topically biased clusters;
scoring and filtering the statistics based on a measure of relevance;
generating a view of the content nodes within the topically biased cluster by aggregating the scored and filtered statistics; and
selecting one or more descriptive concepts and keywords for each content node in the topically biased cluster based on the generated view, wherein the one or more concepts comprise the one or more descriptive concepts and keywords;
finding and scoring one or more conceptual association based on the tagged, grouped content nodes and patterns of co-occurrence of the one or more concepts in the tagged content nodes, the one or more conceptual associations indicating a relevance of the one or more associations; and
generating a conceptual association graph across the topically-biased clusters based on the one or more associations between the one or more concepts.

2. The method of claim 1 wherein the connectedness of each content node to other content node members is defined by links between each content node and the other content node members.

3. The method of claim 2, wherein the links are generated from metadata entities.

4. The method of claim 3, wherein a content node is connected to other content nodes if the content node and the other content nodes are tagged with the same metadata entity.

5. The method of claim 3, wherein the metadata entity comprises at least one of category tagging and descriptive keywords.

6. The method of claim 2, wherein the links are pre-processed and tagged.

7. The method of claim 6, wherein pre-processing the links comprises classifying the links based on type and assigning the links weights.

8. The method of claim 1, wherein the nodes are grouped using a community finding algorithm.

9. The method of claim 1, wherein concepts are n-grams, and wherein the n-grams comprise one or more a string of n consecutive words, phonemes or other atomic tokens in the content node.

10. The method of claim 1, wherein the measure of relevance of a concept in a group is determined by a number of statistics, including weighted token frequency, community document frequency and global document frequency.

11. The method of claim 1, wherein the most important concepts in a group are selected to tag the group.

12. The method of claim 11, wherein the most important concepts are the concepts with scores above a certain threshold.

13. The method of claim 1, wherein establishing the one or more associations between the one or more concepts comprises:
pre-processing the tagged content nodes by merging tags for the same content node; and
scoring the one or more associations based on a pattern of appearance of concept pairs within the content nodes.

14. The method of claim 13, further comprising weighing the score by a probability that a content node should be tagged with a concept.

15. The method of claim 13, further comprising weighing the score through a global measure of relevance of the content nodes that are tagged with a concept.

16. The method of claim 13, wherein the score is determined by the positional information of an extracted concept within a concept node.

17. A computer system comprising:
memory; and
a processor coupled to the memory, the processor comprising:
a content grouping module configured to group content nodes into one or more topically biased clusters, the content nodes comprising structured digital content and unstructured digital content, the grouping based at least in part on the connectedness of each content node member to other content node members in the same cluster;
a concept extraction module configured to tag the content nodes in each of the one or more topically biased clusters with one or more concepts after the content nodes are grouped into one or more topically biased clusters, wherein the concept extraction module is configured to tag the content nodes by analyzing content of the content nodes in each group and extracting a plurality of collective token and potential concept statistics for the grouped content nodes in one of the one or more topically biased clusters, scoring and filtering the statistics based on a measure of relevance, generating a view of the content nodes within the topically biased cluster by aggregating the scored and filtered statistics, and selecting one or more descriptive concepts and keywords for each content node in the topically biased cluster based on the generated view, wherein the one or more concepts comprise the one or more descriptive concepts and keywords; and a conceptual map builder configured to find and score one or more conceptual associations based on the tagged, grouped content nodes and based on patterns of co-occurrence of the one or more concepts in the tagged content nodes, the one or more conceptual associations indicating a relevance of the one or more associations, and wherein the conceptual map builder is further configured to generate a conceptual association graph across the topically biased clusters based on the one or more associations between the one or more concepts.

18. The computer system of claim 17 wherein the concept extraction module comprises a text tokenizer to analyze the content of the nodes in each group and extract several collective token statistics.

19. The computer system of claim 17 wherein the conceptual map builder comprises a proximity engine to score concept associations based on a pattern of appearance of concept pairs within content nodes.

20. A non-transitory computer-readable media having computer executable instructions stored thereon which cause a computer system to carry out a method when executed, the method comprising grouping content nodes into one or more topically biased clusters, the content nodes comprising structured digital content and unstructured digital content, the grouping based at least in part on the connectedness of each content node member to other content node members in the same cluster;

tagging the grouped content nodes in each of the one or more topically biased clusters with one or more concepts after grouping the content nodes into one or more topically biased clusters, wherein tagging the content nodes comprises:

analyzing content of the content nodes in each group and extracting a plurality of collective token and potential concept statistics for the grouped content nodes in one of the one or more topically biased clusters;

scoring and filtering the statistics based on a measure of relevance;

generating a view of the content nodes within the topically biased cluster by aggregating the scored and filtered statistics; and selecting one or more descriptive concepts and keywords for each content node in the topically biased cluster based on the generated view, wherein the one or more concepts comprise the one or more descriptive concepts and key words;

finding and scoring one or more conceptual associations based on the tagged, grouped content nodes and based on patterns of co-occurrence of the one or more concepts in the tagged content nodes, the one or more conceptual associations indicating a relevance of the one or more associations; and generating a conceptual association graph across the topically biased clusters based on the one or more associations between the one or more concepts.

21. The computer readable media of claim 20 wherein the nodes are grouped using a community finding algorithm.

22. The computer readable media of claim 20 wherein establishing the one or more associations between the one or more concepts comprises:

pre-processing the tagged content nodes by merging tags for the same content node; and scoring the one or more associations based on a pattern of appearance of concept pairs within the content nodes.

* * * * *